United States Patent
Bellwood et al.

(10) Patent No.: US 8,023,693 B2
(45) Date of Patent: Sep. 20, 2011

(54) SYSTEM AND METHOD FOR SOLVING THE "BIRTHDAY PROBLEM" WITH WATERMARKING

(75) Inventors: Thomas A. Bellwood, Austin, TX (US); James M. Gasiewski, Woodside, CA (US); Donald E. Leake, Jr., Vestal, NY (US); Jeffrey B. Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 768 days.

(21) Appl. No.: 12/131,073

(22) Filed: May 31, 2008

(65) Prior Publication Data

US 2009/0034785 A1 Feb. 5, 2009

Related U.S. Application Data

(63) Continuation of application No. 11/833,981, filed on Aug. 4, 2007, now Pat. No. 7,885,427.

(51) Int. Cl.
*G06K 9/00* (2006.01)
*H04L 9/32* (2006.01)

(52) U.S. Cl. .................. 382/100; 382/233; 713/175

(58) Field of Classification Search ........... 382/100, 382/103, 116, 168, 173, 181, 232, 233, 234, 382/235, 236, 237, 238, 239–242, 254, 274, 382/276, 295, 305, 312; 713/175, 176
See application file for complete search history.

(56) References Cited

U.S. PATENT DOCUMENTS

| | | | |
|---|---|---|---|
| 6,563,937 B1 * | 5/2003 | Wendt | 382/100 |
| 6,802,003 B1 * | 10/2004 | Gross et al. | 713/175 |
| 7,046,808 B1 | 5/2006 | Metois et al. | |
| 7,369,677 B2 * | 5/2008 | Petrovic et al. | 382/100 |
| 2005/0283610 A1 | 12/2005 | Serret-Avila et al. | |
| 2006/0136728 A1 * | 6/2006 | Gentry et al. | 713/176 |
| 2006/0174128 A1 * | 8/2006 | Yuval | 713/176 |
| 2006/0239503 A1 * | 10/2006 | Petrovic et al. | 382/100 |
| 2006/0282676 A1 | 12/2006 | Serret-Avila et al. | |

OTHER PUBLICATIONS

Deguillaume et al., "Countermeasures for Unintenetional and Intentional Video Watermarking Attacks", Conference:SPIE—Int. Soc. Opt. Eng. (USA), Jan. 24-26, 2000, vol. 3971, p. 346-357.

* cited by examiner

*Primary Examiner* — Seyed Azarian
(74) *Attorney, Agent, or Firm* — Cantor Colburn LLP; Mohammed Kashef (57) ABSTRACT

A system and method are provided for facilitating the playing of a watermarked video having the "birthday problem". Consumers send the problem disc to an authorization center where the disc is analyzed to determine if it is a legitimate disc. The authorization center generates a digital certificate uniquely associated with the disc and with the video and embeds the digital certificate into the disc. The digital certificate will cause a video player to play the video without checking for the watermark.

17 Claims, 5 Drawing Sheets

SYSTEM AND METHOD FOR SOLVING THE "BIRTHDAY PROBLEM" WITH WATERMARKING

RELATED APPLICATIONS

This application is a continuation application of and claims priority to U.S. application Ser. No. 11/833,981, filed Aug. 4, 2007, which is currently pending, and which is hereby incorporated by reference as if fully set forth.

FIELD OF INVENTION

The present invention generally relates to systems and methods for protecting digital content from unauthorized use, and particularly to systems and methods for solving the "birthday problem" in watermarked digital videos.

BACKGROUND

There is an increasing use of global distribution systems such as the Internet for distribution of digital assets including music, film, computer programs, photographs, games and other content. There is also a concurrent increase in the unauthorized copying, or pirating, of digital content causing considerable economic losses to content providers. Effective countermeasures are important to the viability of businesses engaged in the distribution of digital media.

Many types of countermeasures have been developed to prevent or deter the creation and distribution of unauthorized copies of digital media. Some countermeasures, such as encryption, are directed at preventing pirating in the first place, while others try to locate the source of the unauthorized copies. For example, technologies such as digital watermarking and traitor tracing are directed to finding the sources of unauthorized copies. Digital watermarking involves the addition of a unique mark on each copy of distributed digital content. If an unauthorized copy of the watermarked content is found the watermark may be used to identify the pirate.

In general, a digital watermark may be a pseudo-noise pattern representing the identity of the user, which is superimposed on the content to be distributed. Later, when an unauthorized copy is found, the presence of a particular watermark pattern should reveal the identity of the traitor who has compromised the content.

In addition to using watermarks to determine the source of pirated content, watermarks can also be used to prevent the use of unauthorized content. For example, current watermarking technologies, such as the DVD audio format, and the new blue-laser HD video DVD format, use audio watermarks for copy control purposes. A studio may put an inaudible watermark in the soundtrack of the movie when they release the movie as an authorized DVD. A player, if it detects the watermark in the soundtrack of an unauthorized format (for example, an in-the-clear movie masquerading as a home video DVD), it stops playing.

This technique is very valuable to reduce commercial piracy of movies. However, there is the possibility of a potential consumer problem, illustrated by the following example, referred to as the "birthday party problem", or simply "birthday problem". Assume that a consumer is making a home video of a child's birthday party. It happens that the children are also watching a movie on the TV, while they are being filmed. The soundtrack from the movie will be inadvertently recorded along with the normal audio from the party. This movie soundtrack may have an audio watermark embedded into it. Later, when the movie of the birthday party is played, the player may detect the watermark from the movie soundtrack and, thinking it is a pirate disc, stop playback of the home video.

Heretofore, one technique used to mitigate this problem is to reduce the sensitivity of the watermark detector, in terms of the length of the period of detection that must be observed before action is taken. For example, the player might be required to detect the signal continuously for ten minutes before stopping play. This is not a totally satisfactory solution, however, because innocent home videos could still hit the ten minute limit. Furthermore, pirates may work to reduce the watermark signal in their pirate videos, and might be able to make the watermark signal intermittent enough to avoid the relaxed detection criteria.

Accordingly, there is a need for systems and methods for solving the "birthday" problem with watermarked content. There is also a need for such systems and methods which can solve the birthday problem, are effective in virtually every case, do not make it easier for pirates to circumvent the watermarks, and have a low probability of error.

SUMMARY OF THE INVENTION

To overcome the limitations in the prior art briefly described above, the present invention provides a method, computer program product, and system for solving the "birthday problem" in watermarked videos.

In one embodiment of the present invention a method for authenticating a video file containing a watermark comprises: embedding a signed digital certificate in a video file; reading the video file in a video player; verifying the signed digital certificate in the video player; and instructing the video player to not check for the watermark in the video file if the signed digital certificate is verified.

In another embodiment of the present invention, a system for modifying video to facilitate playing the video on a player, wherein the disc contains a watermark, wherein the system comprises: authorizing center for processing the video received from a consumer; analyzer for determining if the video is legitimate; digital certificate generator for generating a digital certificate uniquely associated with the video; and embedder for embedding the digital certificate into the video disc, the digital certificate causing a video player to play the video without checking for the watermark.

In a further embodiment of the present invention a method for modifying a disc to facilitate playing a video on the disc, wherein the disc contains a watermark, wherein the method comprises: receiving a disc from a consumer; analyzing the disc to determine if the disc is legitimate; generating a digital certificate uniquely associated with the disc and with the video; embedding the digital certificate into the disc, the digital certificate causing a video player to play the video without checking for the watermark.

In an additional embodiment of the present invention, in an article of manufacture for use in a computer system tangibly embodying computer instructions executable by the computer system to perform process steps for authenticating a video file containing a watermark, the process steps comprises: embedding a signed digital certificate in a video file; reading the video file in a video player; verifying the signed digital certificate in the video player; and instructing the video player to not check for the watermark in the video file if the signed digital certificate is verified.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for solving the "birthday problem" with watermarked digital content. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The various elements and embodiments of invention can take the form of an entirely hardware embodiment, an entirely software embodiment or an embodiment containing both hardware and software elements. Elements of the invention that are implemented in software, may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CORIW) and OVO.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

The present invention generally places a signed digital certificate on a problematic home video disc that instructs the player to stop checking for the watermark. In particular, if a consumer has a home video that won't play because of the aforementioned "birthday problem", he/she can mail it away to an authorizing center which will place the certificate on the disc and mail it back. The video now should play, because it contains a signed digital certificate that instructs the player to stop checking for the watermark and, hence, play the disc. This authorization can be done with an online process, as well.

The certificate comprises at least three things: a hash of the actual video, the unique 10 of the disc, and a digital signature of these first two things signed by the authorizing center. A player must verify that signature using the known public key of the authorizing center, verify that the 10 corresponds to the disc it has been asked to play, and verify that the hash of the video it is playing corresponds to the hash in the certificate. Only if these verifications succeed, is watermark detection disabled.

Figure 1:
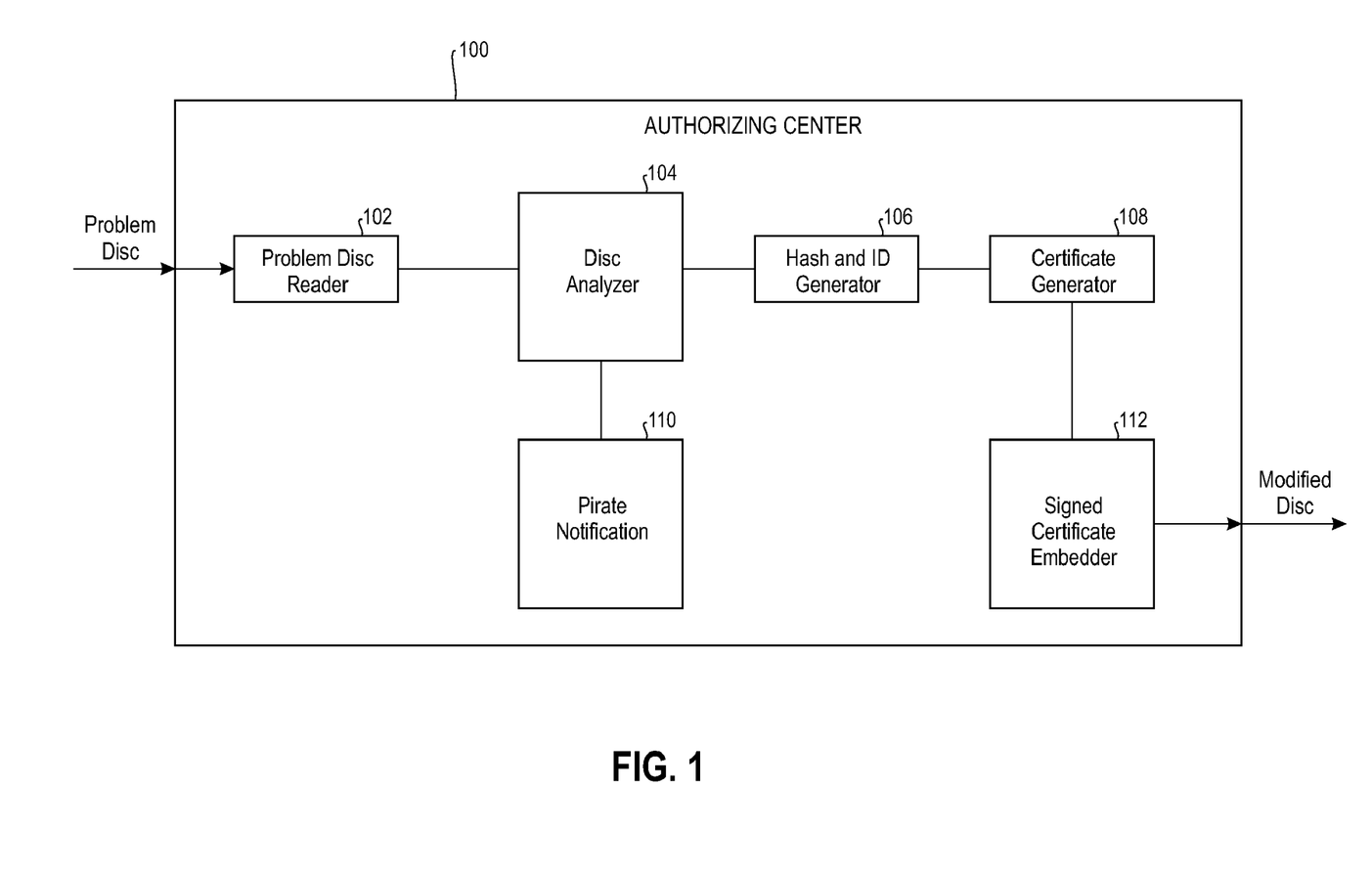
FIG. 1 is a conceptual block diagram of the components of an authorizing center for resolving consumer videos having the "birthday problem" in accordance with one embodiment of the invention.
Figure 3:
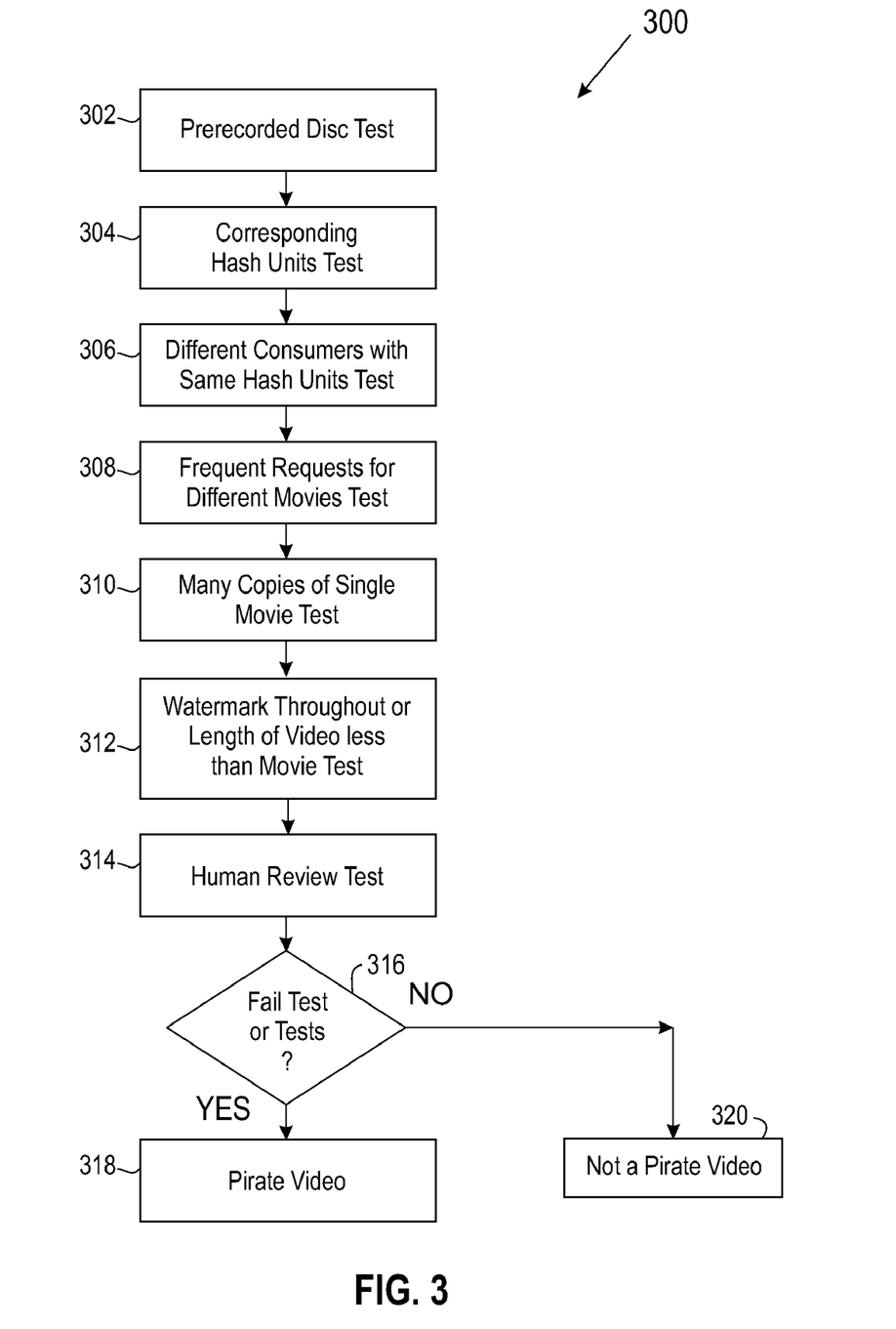
FIG. 3 is a flowchart illustrating the steps performed by the authorizing center shown in FIG. 1 for determining if a disc is a pirate disc in accordance with an embodiment of the invention.
Figure 4:
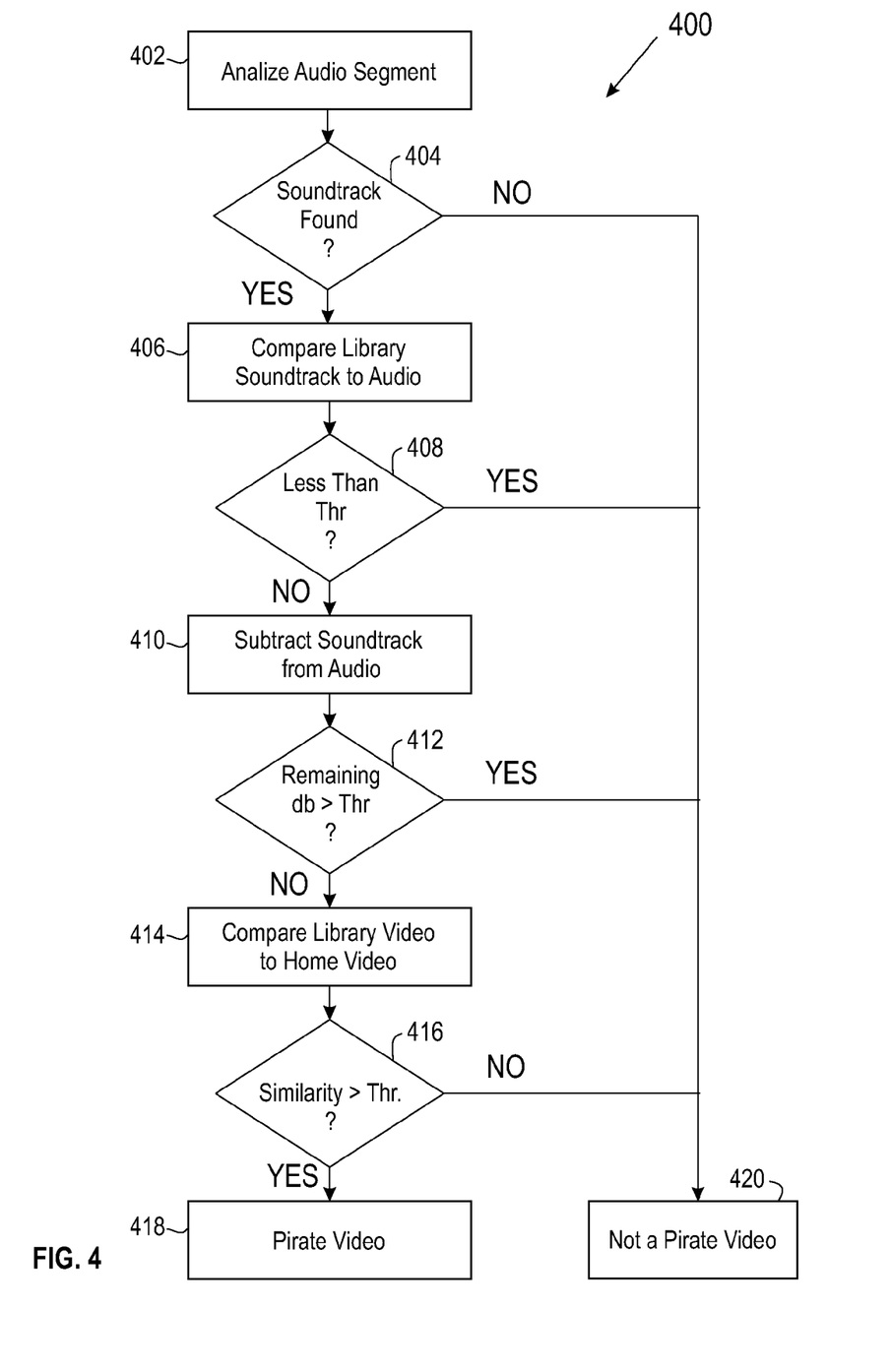
FIG. 4 is a flowchart illustrating additional steps performed by the authorizing center shown in FIG. 1 for determining if a disc is a pirate disc in accordance with an embodiment of the invention.

FIG. 1 shows a conceptual block diagram of an authorizing center 100 in accordance with one embodiment of the present invention. A consumer experiencing the "birthday problem" with a video sends the disc to the authorizing center 100, where it is read by a disc reader 102 and converted into an electronic file. In other embodiments of the invention, the authorizing center may receive the video in forms other than a disc, for example as a data file sent over the internet. A disc analyzer 104 performs an analysis of the data file to make sure that it is not from a pirate disc or to make sure that the consumer submitting the disc is not a pirate. There are a number of techniques for doing this analysis, some of which are shown in FIGS. 3-4 and discussed below. If the disc analyzer 104 determines that the disc is a pirated disc, or that the consumer is a pirate, it sends this information to a pirate notification unit 110, which takes appropriate action. Depending on the circumstances, this action may simply be to not process the disc, or may be to initiate an investigation, and may include legal action against the pirate.

If the disc analyzer 104 determines that the disc and the submitter are legitimate, a hash and 10 generator 106 will generate a hash of the video and an identification number, which is uniquely associated with the disc. In an alternative embodiment, where the video is received as an electronic file over a network instead of on a disc, the identification number may be uniquely associated with the electronic video file. A certificate generator 108 then will create a signed digital certificate and a signed certificate embedder 112 will embed the signed digital certificate, containing the identification number and the hash, into the electronic file. A new disc containing the modified electronic file may then be returned to the consumer. As described in detail below, this disc should now play on the consumer's video player.

Figure 2:
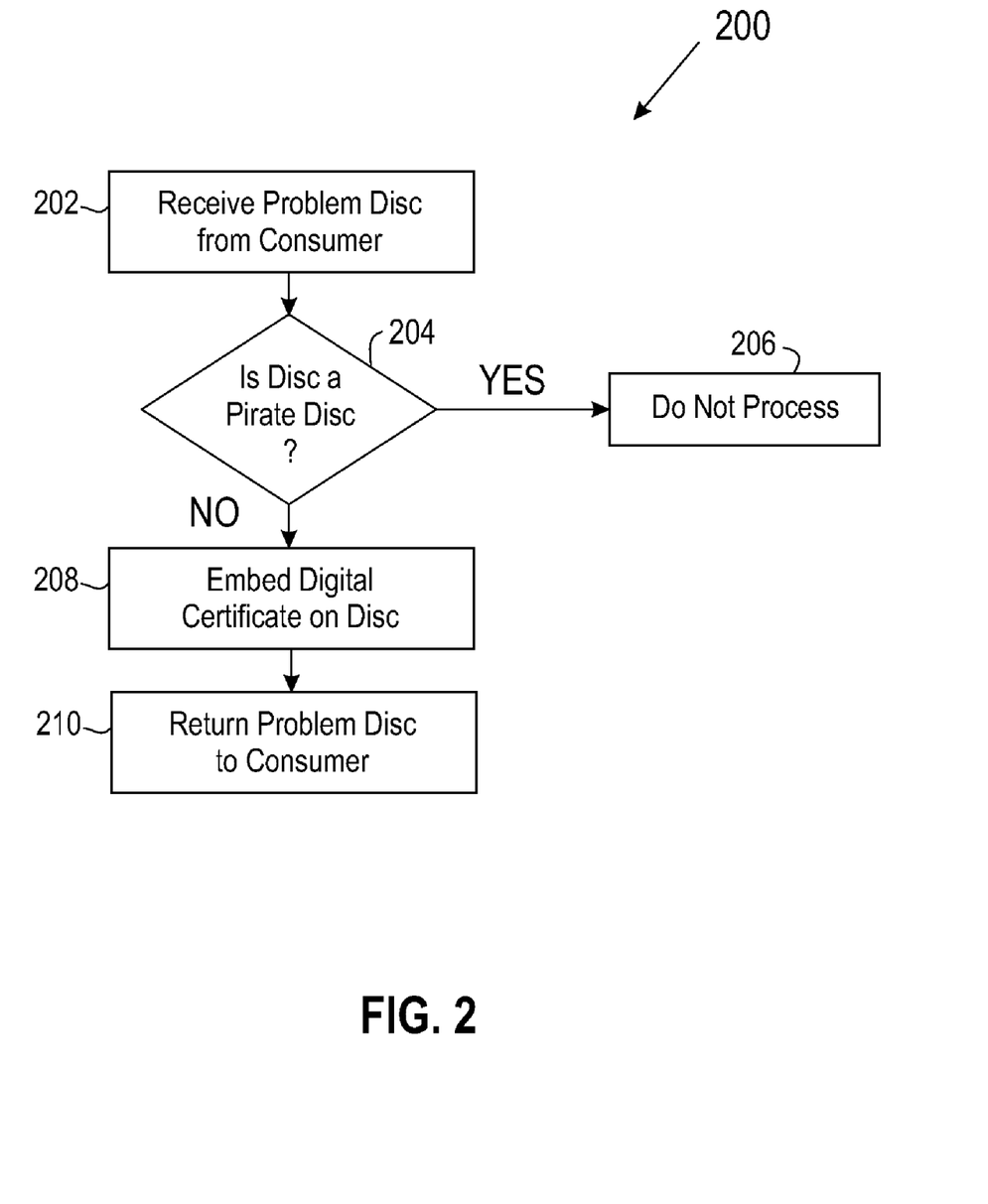
FIG. 2 is a flow chart of the steps performed by the authorizing center shown in FIG. 1 for solving the birthday problem in accordance with an embodiment of the present invention.

FIG. 2 shows a process 200 for solving the "birthday problem" in a movie disc, which may be performed by the authorization center 100. The problem disc is received by the authorization center 100 in step 202. This step may include reading the disc by a disc reader 102. Step 204 next determines if the disc is a pirate disc or not, which may be performed by the disc analyzer 104. Step 206 will halt the processing and take any other appropriate action if the disc has been determined to be a pirate in step 204.

If step 204 determines that the disc and the consumer submitting the disc are legitimate, step 208 will then embed the signed digital certificate, containing the hash and identification number, into the data file. The data file is then stored on the disc, or on a new disc, and returned to the customer in step 210.

A serious concern is that a user may submit a pirate video and attempt to obtain a certificate for it. First of all, since a certificate is valid only for a single disc (because the disc 10 is part of the certificate), this attack is self-limiting, and unlikely to become a serious pirate channel. Secondly, the consumer can be asked to identify himself when he asks for a certificate, which acts as an inhibitor on illegal action. Nonetheless, in one embodiment of the present invention, automatic and manual fraud detection logic may be provided to distinguish legitimate home video from pirate video. While other fraud detection approaches may also be used with this invention, several exemplary techniques are described herein and shown in FIGS. 3 and 4.

In more detail, FIG. 3 shows a process 300, for detecting fraudulent videos which may be used by the disc analyzer 104 shown in FIG. 1 and by step 204 in FIG. 2. The first step 302 is to determine if the disc is a prerecorded disc (ROM disc); if it is, it is not a home video and is obviously a pirate. Step 304 determines if two or more hash units in the alleged home video correspond to hash units in an actual studio movie. A hash unit is a small segment of the video (for example, ½ second of video), and the corresponding hash for that segment. If so, it is extremely unlikely that two hash units from home videos could be equal to released videos due to chance alone, so it can be concluded that the disc is a pirate. Even if the hashes of the hash units do not correspond to known legitimate movies, step 306 will next determine if different consumers have requested certificates for discs with the same hash units; the higher the number of consumers who request certificates, the more likely the video is pirate. The logic being that two true home videos from two different consumers would be unlikely to have identical hashes in any hash units-certainly not in a large number of them.

If a single consumer frequently asks for certificates for different movies, step 308 will determine that the movies are likely to be pirate. The logic here is that few consumers will actually encounter the birthday party problem, so if a single consumer is alleging that it is happening to him frequently, it is likely evidence of fraud.

Step 310 will determine if a single consumer asks for certificates for a large number of copies of a single movie, in which case it is unlikely to be a home video. Step 312 will determine if the watermark is detected throughout the video, and the video is movie length, in which case it is likely that the video is a pirate. Conversely, step 312 will also determine if the length of the video itself and/or the detection period is significantly less than movie length, in which case the movie is very likely innocent. Finally, the authorization center 100 may have someone personally view the movie (or a segment of it) in step 314. A human can quickly tell whether a movie is pirate or a home video inadvertently picking up a movie soundtrack.

Step 316 will sum up the results of all these tests in steps 302-314 and make a determination of whether the video is a pirate or not. If step 316 determines that the video is a pirate, step 318 will take the process to step 206 in FIG. 2. If step 316 determined that the disc is not a pirate, step 320 will take the process to step 208 in FIG. 2. Note that some of the above tests are definitive and further tests may not be needed after a pass or failure of the test. Other tests may yield a probability that the disc is a pirate, hence step 316 may look at some combination of the above tests before making a determination. In some embodiments, this determination may weigh the results for the different tests differently.

Also, it should be noted that many of the tests in FIG. 3 could be performed if the user only sent the hashes of the hash units, rather than the entire disc. In this case, very little data need be transmitted between the user and the authorizing center 100, and the process in FIG. 2 could be carried on with an online process, instead of physically moving the consumer's disc.

In another embodiment of the present invention, step 204 in FIG. 2 may use a pirate detection process 400 shown in FIG. 4. Process 400 may be used either instead of, or in addition to, the process 300 in FIG. 3 to achieve highly accurate automatic detection with virtually no chance of false positives, that is, no chance that an innocent home video would not receive a certificate. Step 402 first performs an analysis of the audio segment in the problem disc. This will include taking a segment of the watermarked audio, and comparing it with a library of legitimate watermarked movie soundtracks. Algorithms to do this are well know in the art, where they are generally called fingerprinting algorithms. If no soundtrack is found, as determined by step 404, this means that ambient noise defeated the library lookup. A pirate movie soundtrack would never have large ambient noise, or else it would be too annoying to be listen too. Hence, the process 400 will move to step 420, where it is determined that the video is innocent.

If the soundtrack is found, step 406 will compare the library soundtrack to the audio in the video. If the video soundtrack contains less than some threshold percentage of the library soundtrack, as determined in step 408, the process 400 will conclude that the video is innocent and move to step 420. Otherwise, the process will move to step 410, which will logically subtract the library soundtrack from the audio. If greater that some predetermined average decibel level of audio energy remains as determined by step 414, the process 400 will conclude the video is innocent and move to step 420.

Otherwise, step 414 will compare the video portion from the library movie to the home video. If the video compares (not bit-far-bit, but using a recognition algorithm that allows some noise), such that some similarity threshold is exceeded, then the process will conclude the home video is pirate and move to step 418. Otherwise, process 400 will conclude the video is innocent and move to step 420.

Figure 5:
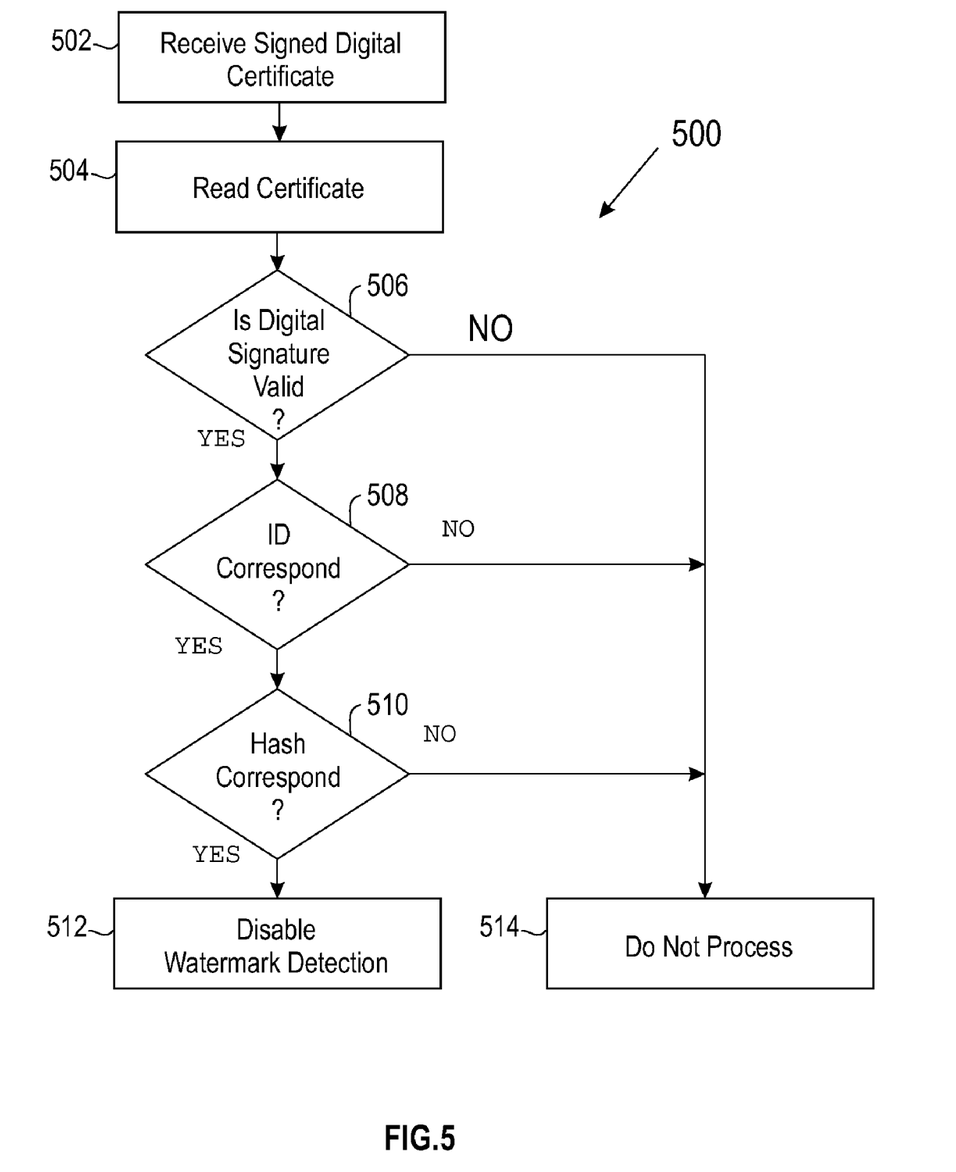
FIG. 5 is a flowchart illustrating additional steps performed by a video player when playing a disc processed by the authorizing center shown in FIG. 1 for permitting the playing of a disc having the "birthday problem" in accordance with an embodiment of the invention.

Once the consumer's problem video passes the pirate detecting tests, the signed digital certificate is added to the video data and the video is returned to the consumer. The consumer may then load the disc into a DVD player, other playback device. As shown in FIG. 5, the player will perform a process 500 which should result in the disc being played. First, the player will receive the signed digital certificate, as shown in step 502, and read the digital certificate, as shown in step 504. This will be done using a known public key of the authorization center. Note that unless a player is processing a copy control watermark, there is no need to be able to process this certificate. Currently commercial DVD players do not generally process such watermarks. However the Advanced Access Content System (AACS) protection scheme for high definition DVD players has announced that in the future, newly manufactured players will be required to check for the watermark. At the same time, these players can easily be designed to check for the properly-signed certificate envisioned by the present invention. The process 500 will then determine if the digital signature is valid in step 506. If not, the player will not proceed further and will not play the disc, as shown in step 514.

If step 506 determines that the digital signature is valid, step 508 will then determine if the disc identification number corresponds to the disc it has been asked to play. If not, the player will move to step 514 and will not play the disc. If the identification number does correspond, the process 500 moves to step 510 which determines if the hash of the video it is playing corresponds to the hash in the certificate. If not, the process 500 moves to step 514 and the disc will not play. If the hash does correspond, step 512 will disable watermark detection and the player will play the disc.

It should be noted that the hash verification of video content is already a function present in the current high-definition DVD video players. In these players, there is a level of indirection: the primary hash is actually a hash of a table of subsidiary hashes. These subsidiary hashes are hashes of small segments of video, called hash units, for example, a hash unit might be one half second of video. To reduce the overhead on the player, it is allowed to randomly sample the correctness of a fraction of the hash units rather than checking the entire video. However, all hash techniques are within the scope of the present invention.

Although the embodiments disclosed herein may have been discussed used in the exemplary applications where the digital content is a movie on a DVDs, those of ordinary skill in the art will appreciate that the teachings contained herein can be apply to may other kinds of content and systems for managing access to content. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiment of the present invention has been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

We claim:

1. A method for authenticating a video file containing a watermark comprising:
   testing the video file to determine whether the video file is legitimate, the testing comprising:
   determining whether two or more hash units in the video file correspond to hash units of a known legitimate video, and if they do, identifying the video file as not legitimate;
   determining a number of different consumers requesting digital certificates for video files with the same hash units, and if the number of consumers exceeds a predetermined threshold, identifying the disc as not legitimate;
   in the event the testing results in the video file being determined as legitimate, embedding a signed digital certificate in the video file;
   reading the video file in a video player;
   verifying the signed digital certificate in the video player; and
   instructing the video player to not check for the watermark in the video file if the signed digital certificate is verified.

2. The method of claim 1 further comprising playing the video file on the video player if the signed digital signature is detected.

3. The method of claim 1 wherein the embedding comprises placing a hash of the video file in the signed digital certificate.

4. The method of claim 3 wherein the embedding comprises embedding an identifier uniquely identifying the video file.

5. The method of claim 4 wherein the embedding comprises;
   creating a digital signature of the hash and the identifier; and embedding the digital signature in the signed digital certificate.

6. The method of claim 1 wherein the verifying comprises:
   verifying the digital signature using a known public key;
   verifying that the identifier corresponds to the video file; and
   verifying that the hash of the video file corresponds to the hash in the signed digital certificate.

7. The method of claim 1 wherein the video file is stored on an optical disc.

8. The method of claim 1 wherein the video file is stored in computer memory.

9. A system for modifying video to facilitate playing the video on a player, wherein the disc contains a watermark, the system comprising:
   an authorizing center configured to process the video received from a consumer;
   an analyzer configured to determined if the video is legitimate, the analyzer configured to determine a number of different consumers requesting digital certificates for discs with the same hash units, and if the number of consumers exceeds a predetermined threshold, identifying the disc as not legitimate;
   a digital certificate generator configured to generate a digital certificate uniquely associated with the video; and an embedder configured to embed the digital certificate into the video disc, wherein the digital certificate causes a video player to play the video without checking for the watermark.

10. The system of claim 9 wherein the video is stored on a disc.

11. The system of claim 10 wherein the analyzer is configured to determine whether two or more hash units in the video correspond to hash units of a known legitimate video, and if they do, identifying the disc as not legitimate.

12. The system of claim 11 wherein the analyzer is configured to determine the number of requests for digital certificates received from a single consumer, and if the number exceeds a predetermined threshold, identifying the disc as not legitimate.

13. The system of claim 11 wherein the analyzer is configured to determine if a watermark is detected for a portion of the video exceeding a predetermined threshold, and if the portion exceeds the threshold, identifying the disc as not legitimate.

14. The system of claim 11 wherein the analyzer is configured to determine a soundtrack of the video and performing at least one of the following tests on the soundtrack of the video to determine if the disc is legitimate:
   determining if a soundtrack of a legitimate movie is present in the soundtrack of the video;
   determining if the soundtrack of the video contains at least a predetermined threshold percentage of the soundtrack of a legitimate movie;
   and subtracting the soundtrack of a legitimate movie from the soundtrack of the video.

15. The system of claim 9 wherein the video is received as an electronic file through a computer network.

16. A non-transitory, computer readable storage medium embodying computer instructions thereon executable by a computer system to perform a method for authenticating a video file containing a watermark, the method comprising:
   testing said video file to determine whether the video file is legitimate, the testing comprising:
   determining whether two or more hash units in the video file correspond to hash units of a known legitimate video, and if they do, identifying the video file as not legitimate;
   determining a number of different consumers requesting digital certificates for video files with the same hash units, and if the number of consumers exceeds a predetermined threshold, identifying the disc as not legitimate;
   in the event the testing results in the video files being determined as legitimate, embedding a signed digital certificate in the video file;
   reading the video file in a video player;
   verifying the signed digital certificate in the video player; and
   instructing the video player to not check for the watermark in the video file if the signed digital certificate is verified.

17. The storage medium of claim 16 wherein the video file is on a disc and the embedding further comprises:
   placing a hash of the video file in the signed digital certificate;
   and embedding an identifier uniquely identifying the disc.

* * * * *